United States Patent
Emens et al.

(10) Patent No.: US 6,519,557 B1
(45) Date of Patent: Feb. 11, 2003

(54) SOFTWARE AND METHOD FOR RECOGNIZING SIMILARITY OF DOCUMENTS WRITTEN IN DIFFERENT LANGUAGES BASED ON A QUANTITATIVE MEASURE OF SIMILARITY

(75) Inventors: Michael L. Emens, San Jose, CA (US); Reiner Kraft, Gilroy, CA (US); Peter Chi-Shing Yim, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 09/588,250

(22) Filed: Jun. 6, 2000

(51) Int. Cl.$^7$ .................. G06F 17/20; G06F 17/28
(52) U.S. Cl. .................. 704/8; 707/513; 707/536; 704/5
(58) Field of Search .................. 704/2, 3, 4, 5, 704/6, 7, 8; 707/500, 501, 513, 514, 531, 536

(56) References Cited

U.S. PATENT DOCUMENTS

| | | | |
|---|---|---|---|
| 5,040,218 A | 8/1991 | Vitale et al. ................ 704/9 |
| 5,062,143 A | 10/1991 | Schmitt .................... 704/9 |
| 5,371,807 A | 12/1994 | Register et al. ............ 704/9 |
| 5,392,419 A | 2/1995 | Walton ..................... 704/9 |
| 5,418,951 A | 5/1995 | Damashek .................. 704/9 |
| 5,606,690 A | * 2/1997 | Hunter et al. .............. 707/5 |
| 5,666,442 A | * 9/1997 | Wheeler .................... 382/209 |
| 5,680,628 A | 10/1997 | Carus et al. ............... 704/9 |
| 5,724,593 A | * 3/1998 | Hargrave, III et al. ...... 704/7 |
| 5,848,386 A | * 12/1998 | Motoyama .................. 704/5 |
| 5,867,811 A | * 2/1999 | O'Donoghue ................ 704/1 |
| 5,987,403 A | * 11/1999 | Sugimara ................... 704/2 |
| 6,002,998 A | 12/1999 | Martino et al. ............ 704/9 |
| 6,064,951 A | * 5/2000 | Park et al. ................ 704/8 |
| 6,098,071 A | * 8/2000 | Aoyama et al. ............. 707/102 |
| 6,236,958 B1 | * 5/2001 | Lange et al. ............... 704/8 |
| 6,324,555 B1 | * 11/2001 | Sites ...................... 707/517 |

* cited by examiner

Primary Examiner—Patrick N. Edouard
(74) Attorney, Agent, or Firm—Jon A. Gibbons; Fleit, Kain, Gibbons, Gutman & Bongini P.L.

(57) ABSTRACT

A system for identifying different language versions of the same structured format document (e.g., HTML web page) detects the language of the two documents and translates one or both into a preferred language if necessary, parses the two candidate documents and builds two hierarchical data structure based on the document. The data structures are used to compare the hierarchical structure of the two documents and also to access text portions in congruent positions in the two documents. A fuzzy measure of similarity of a set of text portions occupying congruent positions in the two documents is then obtained, to induce a measure of the similarity of the two documents which is compared to a fuzzy threshold.

16 Claims, 12 Drawing Sheets

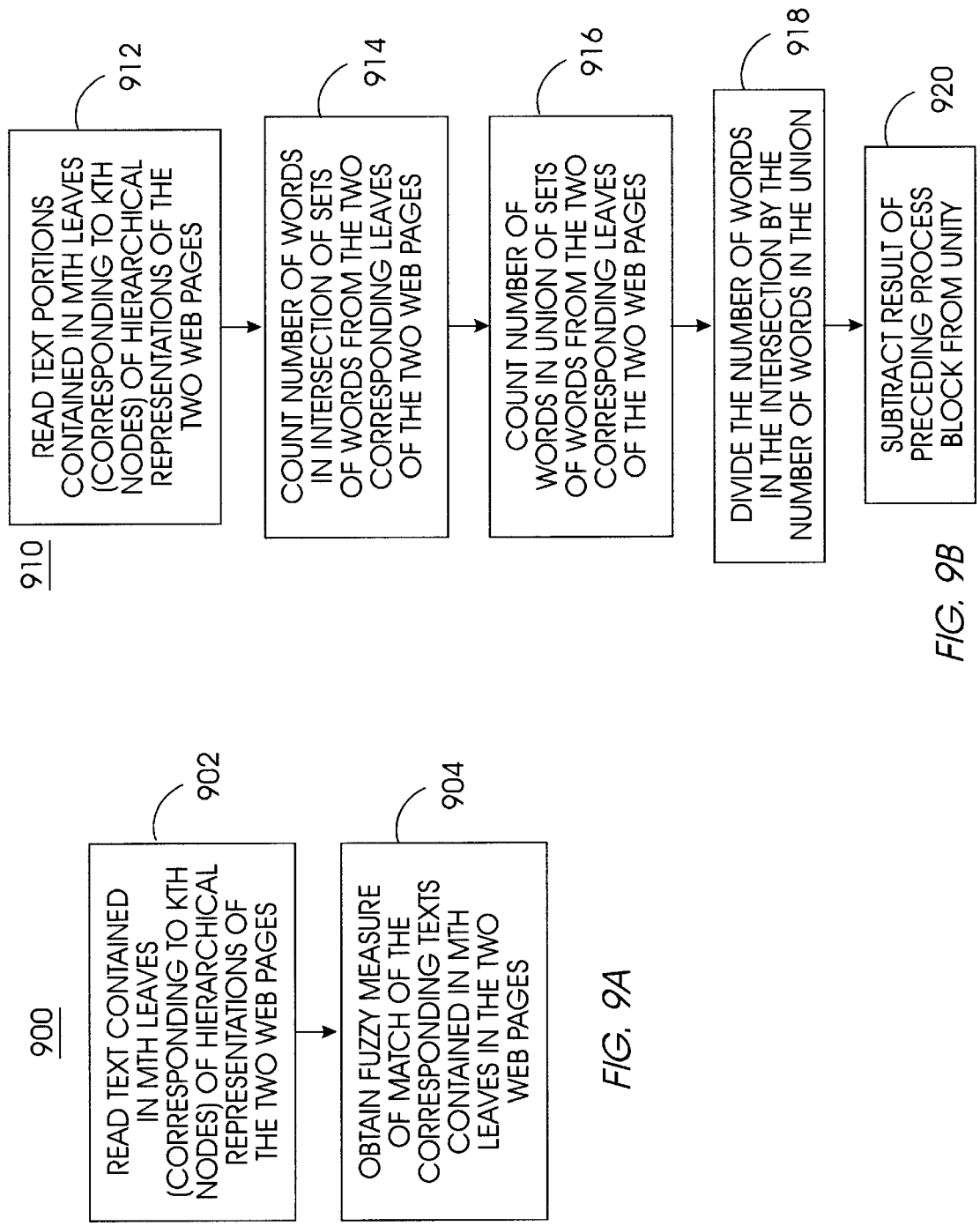

SOFTWARE AND METHOD FOR RECOGNIZING SIMILARITY OF DOCUMENTS WRITTEN IN DIFFERENT LANGUAGES BASED ON A QUANTITATIVE MEASURE OF SIMILARITY

CROSS-REFERENCE TO RELATED APPLICATIONS

Not Applicable

FIELD OF THE INVENTION

This invention pertains to multi-lingual document data warehousing. More particularly the invention pertains to a system and method that can identify duplicates or near duplicates of a document in two different languages.

BACKGROUND OF THE INVENTION

The Internet comprises a vast resource of information in the form of web pages. These web pages comprise text, graphics, video and other forms of information on a variety of topics the range of which is coextensive with the vast range of users' interests. The Internet is a global network and thus serves a diverse multi-lingual community.

In the interest of serving the Internet's multi-lingual community, large organizations and companies may have very large web sites, built up over many years by many people. The sites can be so large that no single person has extensive knowledge of the entire site architecture. These sites may often contain multi versions of documents written in different languages. In some cases different language versions of a web site may be located on different hosts or have separate domain names and be stored in separate directory structures. As the Internet continues to rapidly develop, there often arises the desire to revamp web sites. In the case of multi-lingual web resources (i.e., a single multi-lingual site, or multiple sites in different languages) a plan for revamping may include identifying different language versions of the same document as such. The plan might further include eliminating duplicative documents, in preference of using a real time machine translation function to present the web page to the user, or it might alternatively include adding cross references to the web pages to the different language versions.

A third party such as a search engine dot com might also want to identify different language versions of the same document so as to enable it to present information identifying different language versions to a user.

Because of the layout differences for some languages, for example, Japanese, often being written vertically rather that horizontally, and Hebrew being written from right to left rather than from left to wright, different language versions of the same web page may have a somewhat different Hyper Text Markup Language (HTML) structure in order to accommodate the layout of the particular language. Thus, a strict comparison on the basis of the HTML code structure alone cannot be relied on to identify different language versions of the same document.

The invention to be described makes use of machine translation. In connection therewith, it should be noted that machine translation does not produce an exact inverse function of the human language translation originally used to produce foreign language versions. There will be differences in the text output by a machine translation function and the original document. Therefore, direct string comparisons between the original document and the translation of the foreign language document back into the original language will not yield a match.

What is needed is a system for identifying duplicate versions of web pages which may be written in two different languages.

What is further needed is a system for identifying different language versions of a document, that can identify that the two documents are the same or similar notwithstanding slight differences in the formatting code (e.g., HTML) structure of the documents.

What is further needed is a system for identifying different language versions of the same document that is tolerant of the imperfections of machine translation.

SUMMARY OF THE INVENTION

Briefly, according to one aspect of the invention, a method of identifying different versions of the same structured document comprises steps of reading a first portion of text which occupies a first position in a first hierarchical structured document, reading a second portion of text which occupies a second position which is congruent to the first position in a second hierarchical structured document, and obtaining a quantitative measure of similarity of the first and second portions of text.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 9A shows a flow diagram of a method for inducing a fuzzy measure of similarity of two text portions.

FIG. 9B shows a flow diagram of an exemplary method for inducing a fuzzy measure of similarity of two text portions.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Network

Figure 1:
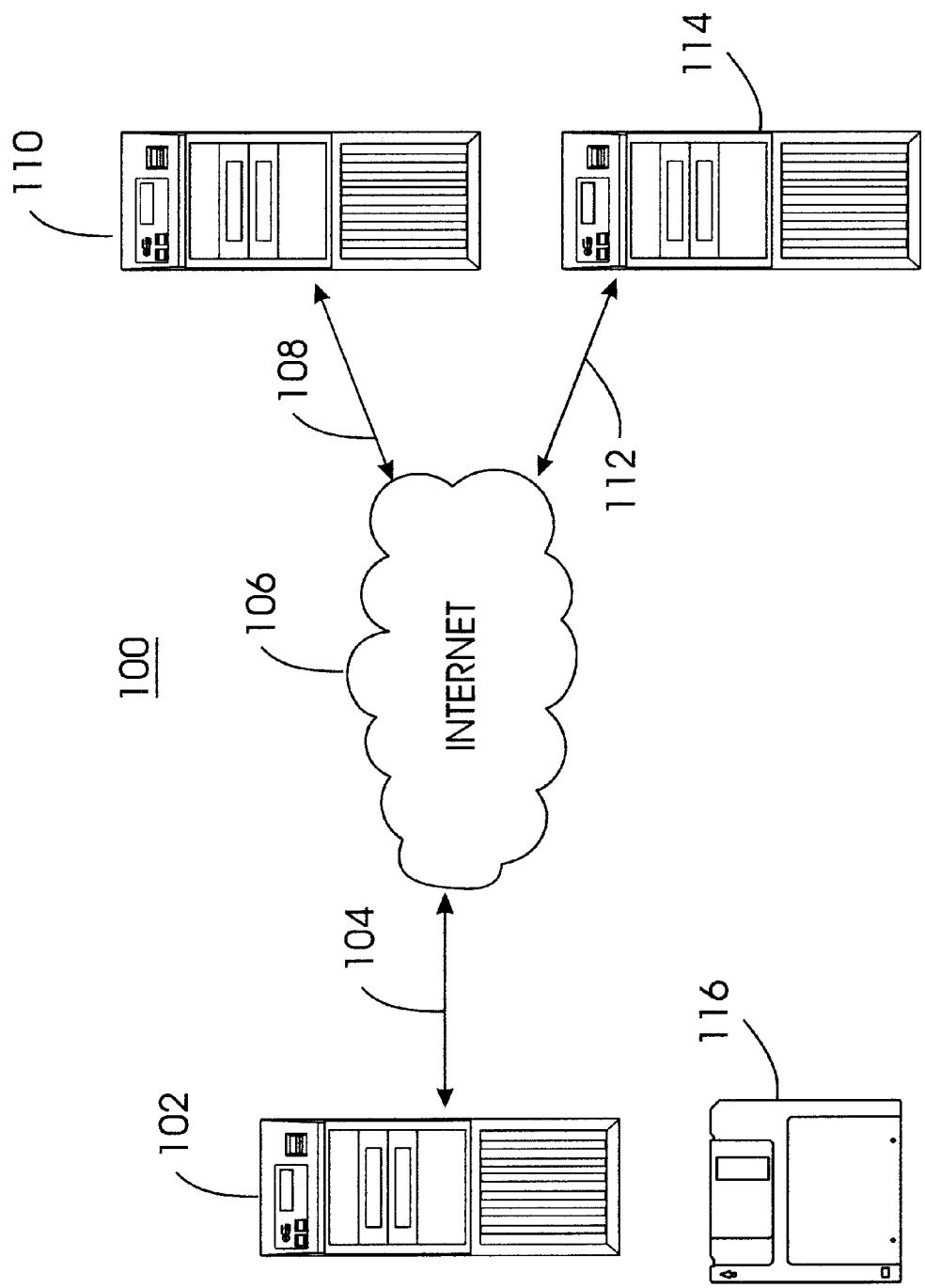
FIG. 1 is a schematic of a computer system used in practicing an embodiment of the invention.

Referring to FIG. 1 a schematic of a computer system 100 used in connection with an embodiment of the present invention is depicted. A web spider server computer 102 is connected to the Internet 106 through a bidirectional data link 104. First 110 and second 114 web page source servers are connected to the Internet 106 through bidirectional data links 108 and 112 respectively.

The bidirectional data links 104, 108, and 112 may for example comprise T1, or DSL lines.

One or more removable computer readable media 116 are provided for loading software onto the web server computer 102, to configure it to perform functions including comparison of different language versions of web documents, as will be described below with reference to the figures.

Exemplary Functional Block Diagram of Various Software Components

Figure 2:
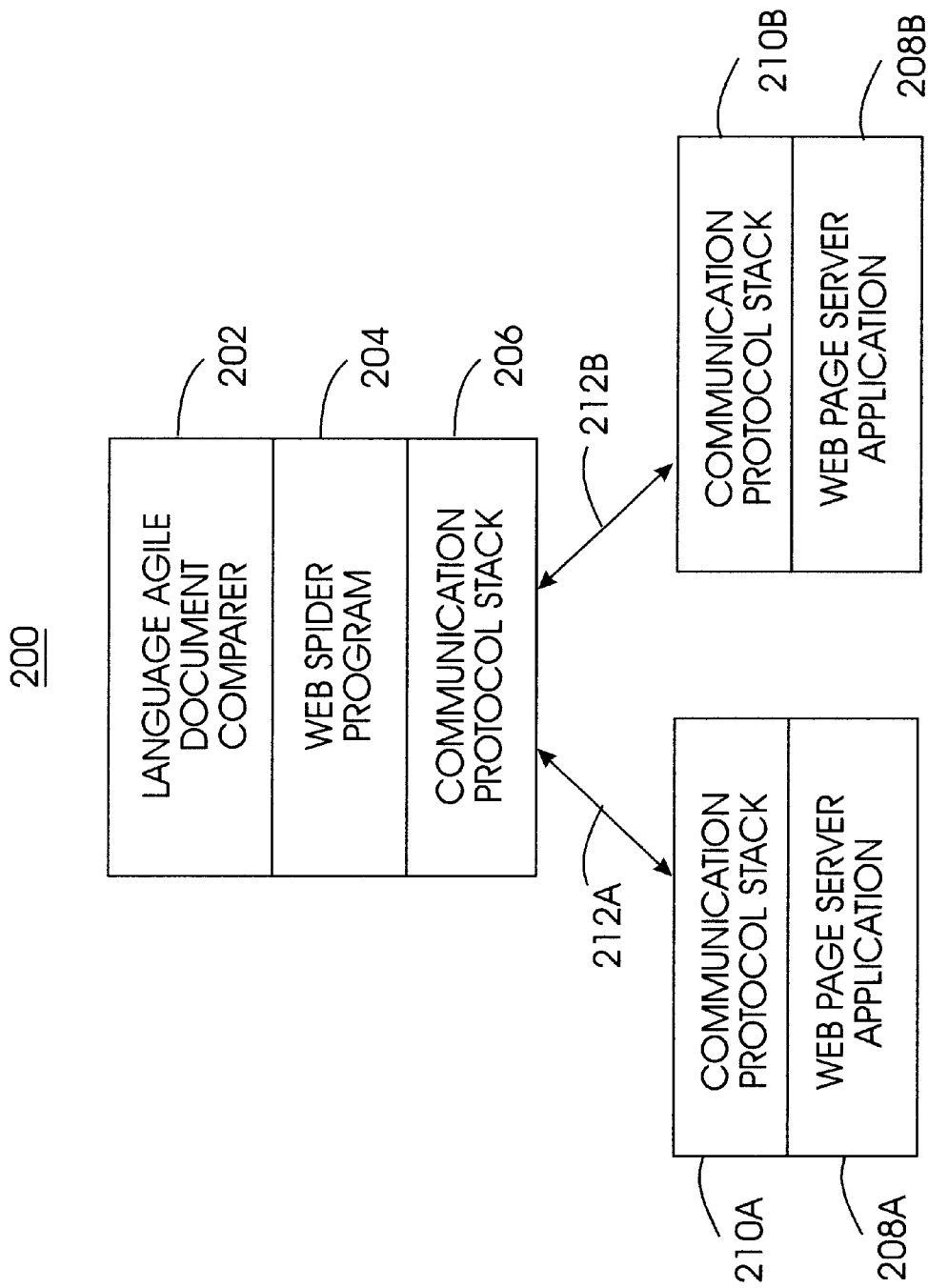
FIG. 2 is a representation of software interrelationship according to an embodiment of the present invention.

Referring to FIG. 2 a schematic 200 representing the interrelationship of software components according to a preferred embodiment of the invention is shown. A web spider server stack which can be run for example on web spider server computer 102 comprises, a language agile document comparer 202, the functioning of which will be described below with reference to flow diagrams. The language agile document comparer receives documents from a web spider program 204. The web spider program 204 functions to retrieve web pages from the Internet, an Intranet, or other storage location. The web spider program 204, the details of which are outside the scope of this invention, can be utilized to traverse a specified web site, and retrieve web pages therefrom. The web spider program 204 employs of communication protocol stack 206. The communication protocol stack may for example comprise Hyper Text Transfer Protocol (HTTP) over Internet Protocol (IP) over Transport Control Protocol (TCP). The web spider program communicates with exemplary first and second web page server application 208A, 208B, which communicate through communication protocol stacks 210A, 210B which may comprise the same layers discussed in connection with communication protocol stack 206. Connections 212A, and 212B which may for example comprise connections through a sequence of servers on the Internet are also shown.

Exemplary High Level Method for Comparing Web Pages Written in Different Languages Referring to FIG. 3, a high level flow diagram 300 of a process of comparing two web pages performed by a language agile document comparer 202 is shown. In process block 302, a first and a second web page are read. The first and second web pages may be received from the web spider program 204 which received the web pages from one or the two web server applications 208A and 208B. In process block 304, the first and second web pages are parsed to extract sequences of formatting codes (e.g., HTML codes), and leaf content (e.g., text portions and image references). In process block 306 data structures representing the hierarchical structure of the formatting codes in the first and second web pages are generated based on the extracted sequence of formatting codes and leaf content. Note that although the instant embodiment is directed to compared HTML based web pages, the invention could can be applied to other structured format multimedia documents, including but not limited to other document types conforming to the Standard Generalized Markup Language (SGML) standard (ISO 8879) promulgated by the International Organization for Standardization, e.g., Extensible Markup Language (XML).

In process block 308, the hierarchical structure of the first and second web pages is compared. Process block 310 is a decision block. If the hierarchical data structures of the two web pages do not match well, then a finding that the two web pages are different language versions of the same document is foreclosed and the process ends at block in block 312. The relative degree of match as determined in process block 308 can be a fuzzy measure of match; it can be a relative quantitative measure that is compared to some predetermined threshold criteria. Comparison of the hierarchical HTML code structure will be described below in more detail with reference to FIG. 3. The comparison of the hierarchical structure of the HTML document can be based on a whole or a part of the HTML code.

Figure 3A:
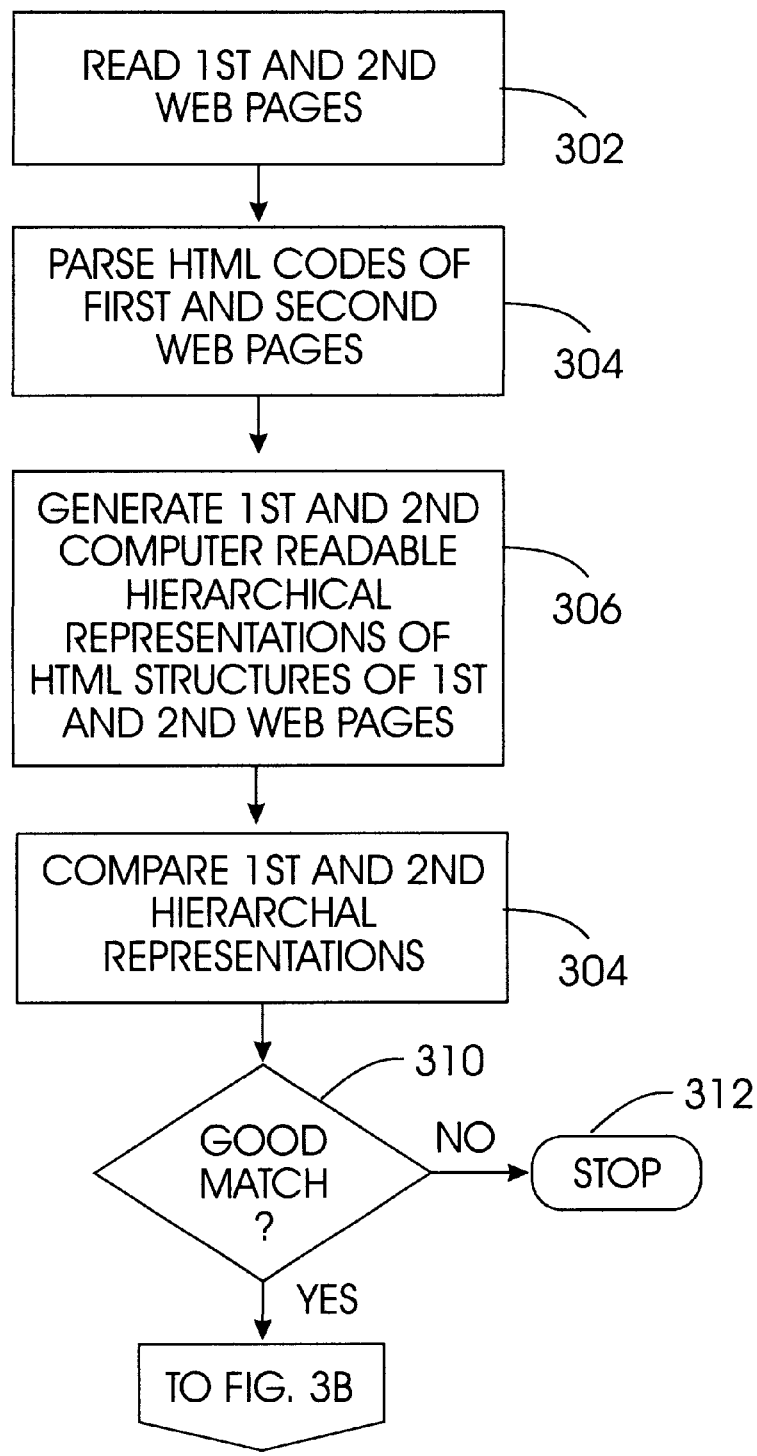
FIG. 3A is a first part of a high-level flow diagram of a process performed by a language agile document comparator according to an embodiment of the invention.
Figure 3B:
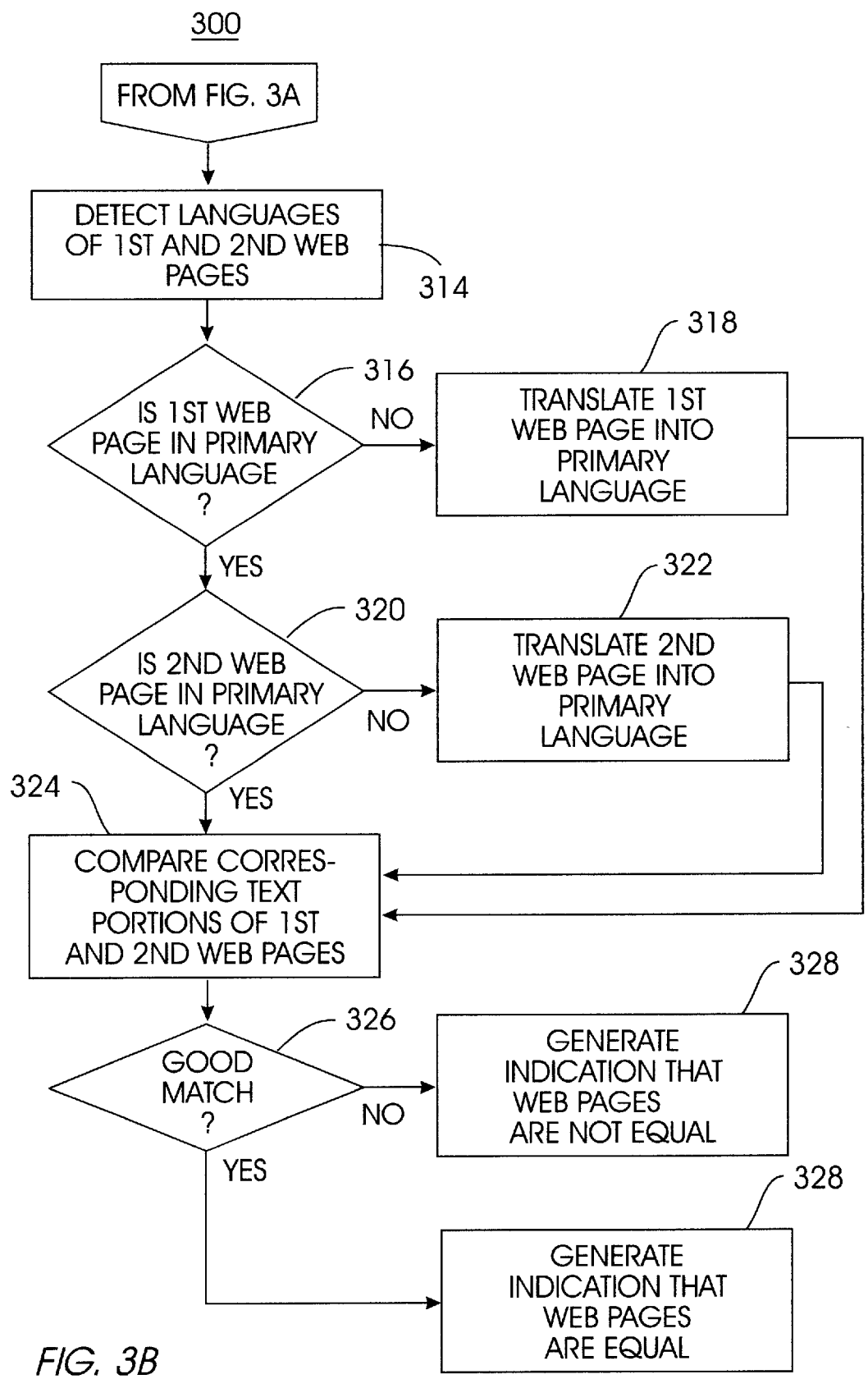
FIG. 3B is a second part of a high-level flow diagram of a process performed by a language agile document comparator according to an embodiment of the invention.

If, in process block 310 the hierarchical data structures do match then, referring to FIG. 3B, in process block 314 the languages of the first and second web pages are detected. Detection of the language will be described below in more detail with reference to FIGS. 8A, 8B. Process block 316 is a decision block that determines if the first web page is in the primary language used by the system (e.g., English). If the first web page is not in the primary language, it is translated into the primary language in process block 318. Similarly process block 320 is a decision block that determines if the second web page is in the primary language. If not, it is translated in process block 322 into the primary language.

In process block 324, corresponding text portions in the first and second web pages are compared. Methods for comparing the text portions will be described below with reference to FIGS. 3A, 3B. Corresponding text portions, are text portions that are enclosed within HTML tags that are located in congruent position of the hierarchical HTML structure of the web pages. One or more sets of corresponding text portions may be compared.

Process block 326 is a decision block. If there is not a good match between the text portions then an indication that the web pages do not match is given in process block 328. On the other hand if there is a good match between the text portions then an indication to that effect is made in process block 330. The indications made in process block 328 and 330 may take the form of entries made in a database, or information displayed on an output device. The information could be accessed by web site administrative personnel. Alternatively, the indications made in process block 328, 330 may be a call to a program which causes some action with respect to the two web pages to occur, e.g., deletion of one.

Discussion of Data Structure for Representing Hierarchical Html Code Page

Figure 4:
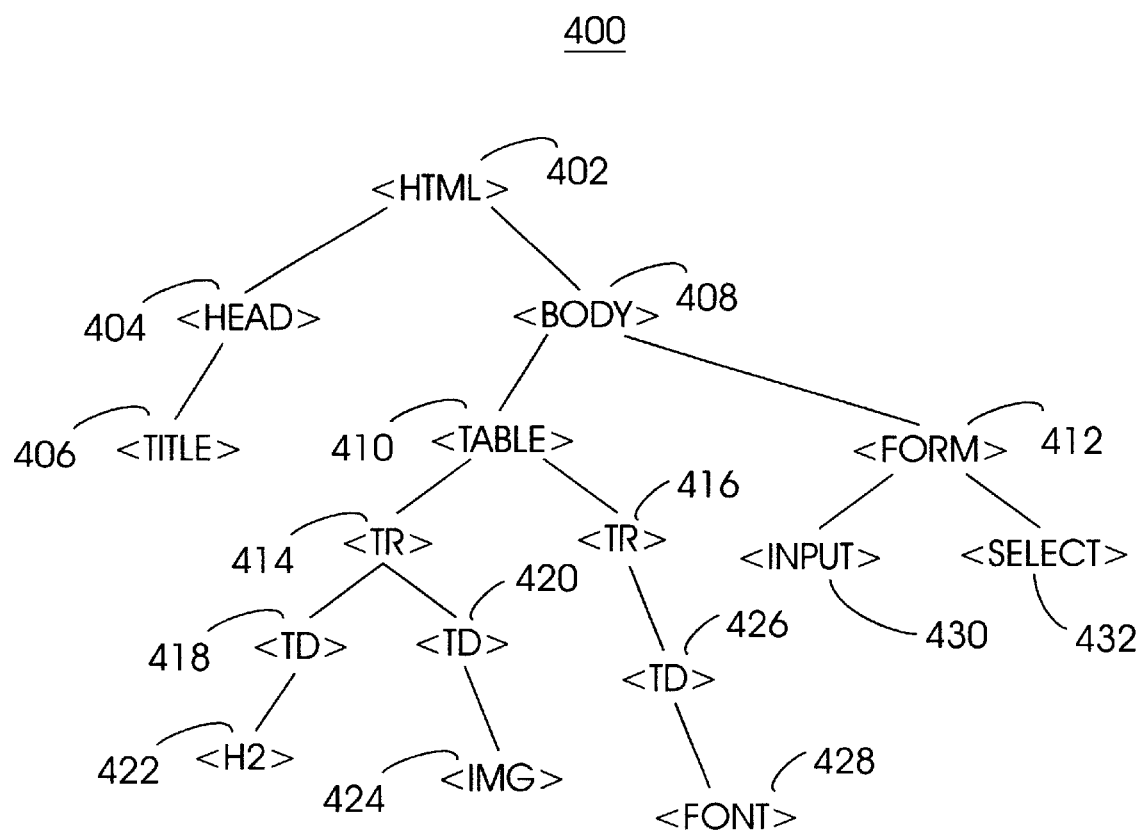
FIG. 4 is a graphical representation of a data structure representing the hierarchical structure of a HTML web page.

Referring to FIG. 4 a graphical representation 400 (tree diagram) of the hierarchical relationships in a hypothetical HTML code page is shown. The root 402 is the <HTML> tag. (HTML tags are shown in angled brackets in accordance with the syntax of HTML). Depending from the root is a <HEAD> tag 404, and a <BODY> tag 408. Depending from the <HEAD> tag 404 is a <TITLE> tag 406. Depending from the body tag is a <TABLE> tag 410, and a <FORM> tag 412. Depending from the <TABLE> tag 410 are first and second <TR> tags 414, 416 indicating the opening of table rows. Depending from <TR> tag 414 are two <TD> tags 418, and 420 indicating column entries. Depending from <TD> tag 418 is an <H2> tag 422 which specifies a text style appropriate for second level headings. Depending from <TD> tag 420 is an <IMG> tag 424 which references an image. Depending from <TR> tag 416 is a <TD> tag 426, from which depends a <FONT> tag 428 which can be used to specify various font attributes. Depending from <FORM> tag 412 are an <INPUT> tag 430, and a <SELECT> tag 432. Closing tags, e.g., </BODY> which are paired with corresponding opening tags are not shown in FIG. 4. The convention used in creating the hierarchical structure, is preferably that the left child of a given node corresponds to an HTML tag that appears first (nearer the top) of the HTML code page than the right child. Alternatively, the children of a given node may be arranged alphabetically from left to right. The former convention yields a more definite dependance of the data structure on the HTML source.

In process blocks 304 and 306 in which the web page is parsed to extract the hierarchical HTML code structure, a data structure can be constructed which can graphically be represented as shown FIG. 4. The actual data structure could for example take the form of a nested array, i.e., an array in which each element can comprise another array in which each element can comprise another array, ad infinitum. The actual depth of the nesting of the array will be determined by the depth of the hierarchy of the HTML code page. At each level of array nesting the array contains peers in the hierarchical structure. At the lowest level of the array, the entries may comprise the text portions, or other content items of the web page, e.g., image references. The tree diagram shown in FIG. 4 can be written as a nested array as follows:

Date_Structure=
    (HEAD(TITLE(text),BODY(TABLE(TR(TD(H2
      (text)),TD(IMG(imageref))),
    TR(TD(FONT(text)))),FORM(INPUT,SELECT)))

Where lowercase 'text' is a place marker for a text portion, and 'img ref', is a marker for an image reference. 'text' and 'img refs' in the terminology of tree diagrams are referred to as leaves. In the syntax presented, matched pairs of parentheses bracket arrays. Storing of text portions in this exemplary data structure would facilitate retrieval of text portions that occupy congruent positions in the two web pages' hierarchical structure, for the purpose of comparison.

The data structure, in addition to being used for accessing corresponding text portions to be compared in process block 324, which is discussed with reference to FIGS. 8, 9A, and 9B below, is also useful in process block 308 in comparing the hierarchical HTML structure of two web pages, as will be discussed below with reference to FIGS. 5A, 5B.

Exemplary Method for Comparing the Hierarchical Structure of Two Web Pages

Figure 5A:
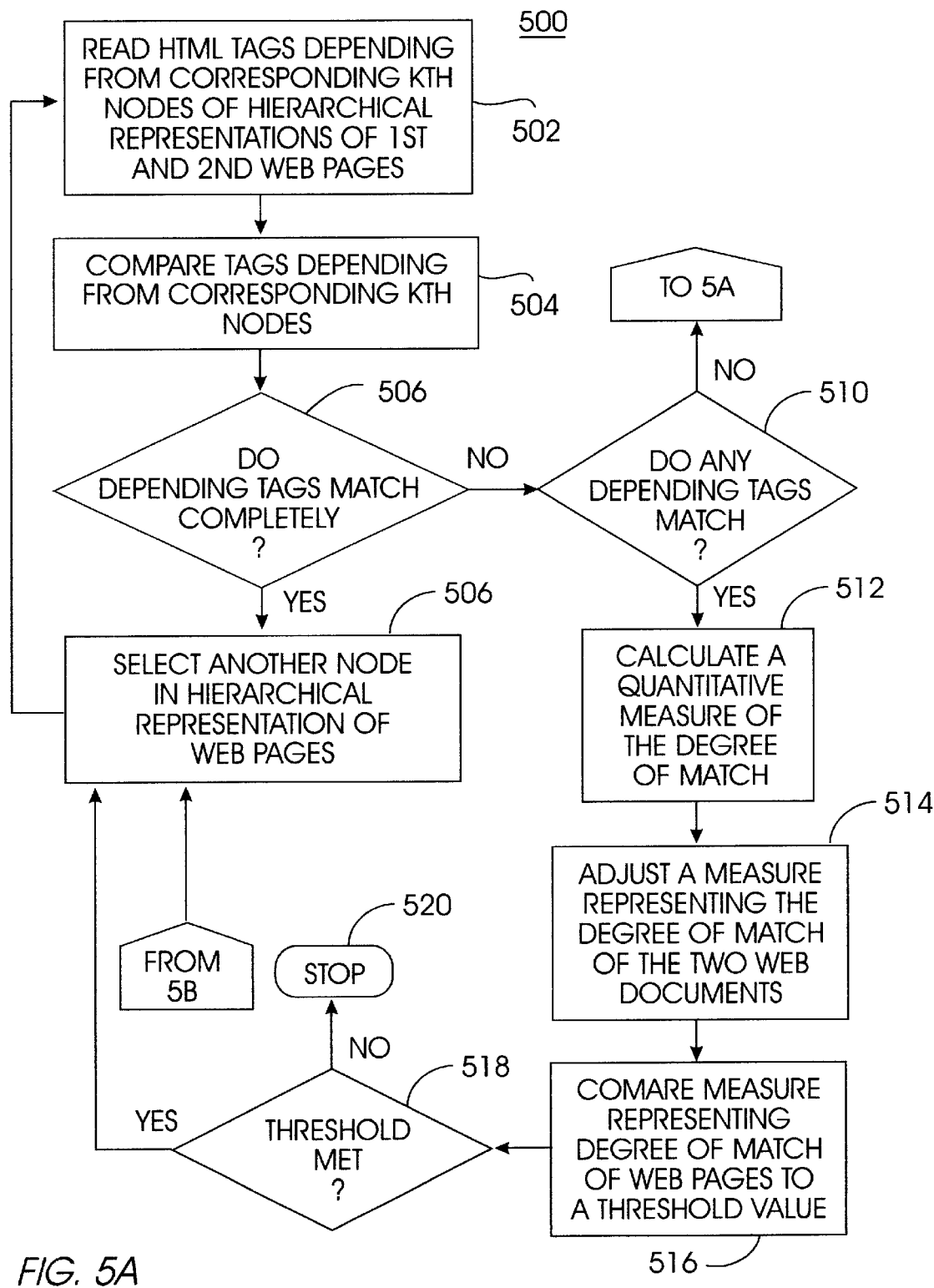
FIG. 5A is a first portion of a flow diagram of a method for comparing the hierarchical structure of two web pages.
Figure 5B:
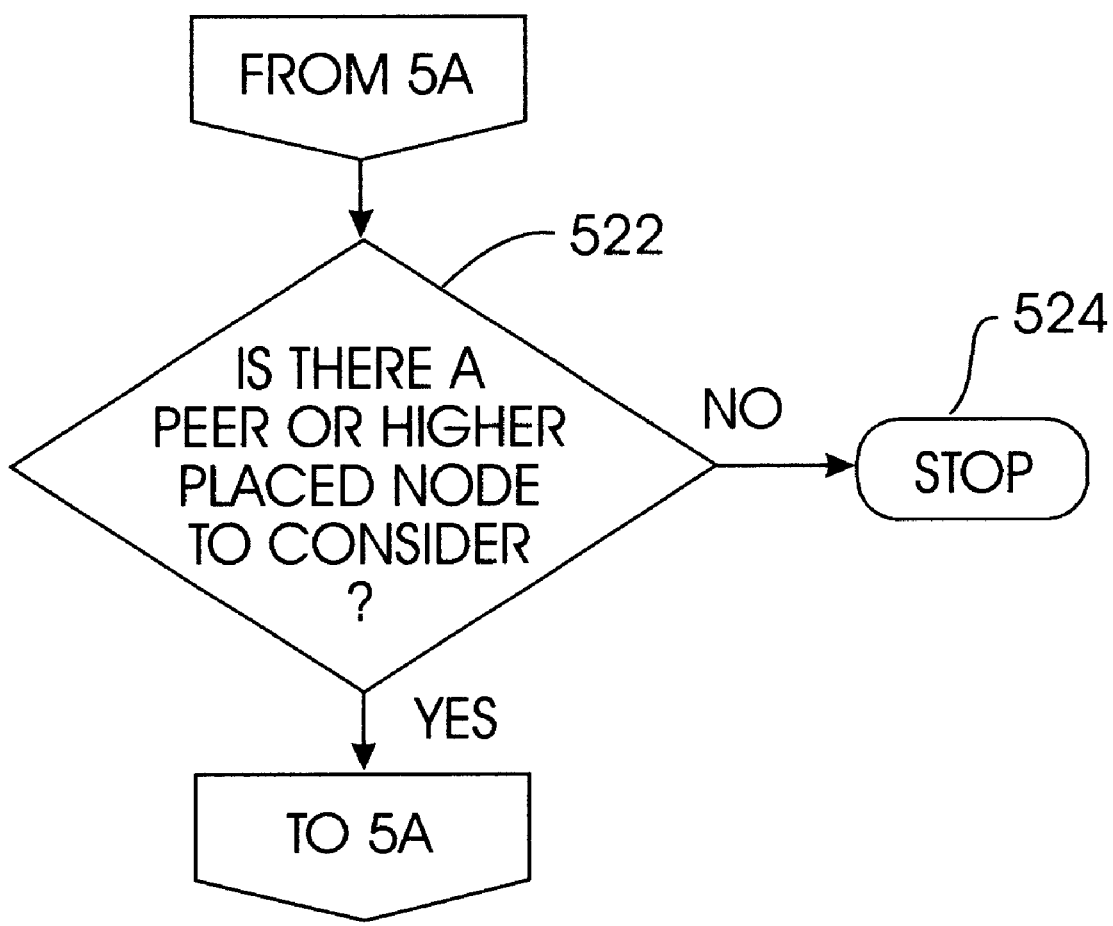
FIG. 5B is a second portion of a flow diagram of a method for comparing the hierarchical structure of two web pages.

Referring to FIGS. 5A, and 5B a flow diagram 500 for comparing the hierarchical structure of two web pages is shown.

In process block 502, the tags depending from a Kth node in the hierarchical representations of the two candidate web pages are read. (Preferably the first node chosen will be the root, and the algorithm will generally proceed to check nodes further down in the hierarchy, notwithstanding that preference there are alternatives for the sequence of choosing nodes as will be illustrated with reference to FIG. 6.) In process block 504, the tags depending from the Kth node in the two web pages will be compared. In process block 506 it is determined if the tags match completely. If so, in process block 508, another node is selected to check, and the process loops back to process block 502. If not, in process block 510, it is determined if any of the tags depending from the Kth node match. If so, in process block 512 a quantitative measure of the degree of match is computed.

The quantitative measure of a match of the tags depending from the Kth node, could for example be a number which decreases from zero as the number of discrepancies between the identity of the tags depending from the Kth node increases. For example it could be the negative of the count of the number of tags that do not match in the two hierarchical structures. The depth of the node at which the discrepancies in the identity of the child nodes in the two hierarchical representation occurs can also be taken into account. For example, a more negative number could be associated with a match discrepancy of the direct children of the root compared to a match discrepancy that occurs four levels down in the hierarchical representations of the web page.

In process block 514 a measure representing the degree of match of the hierarchical structure of the two web pages is adjusted in accordance with the quantitative measure of the match of the tags depending from the Kth node as computed in the process block 512. For example, in the case that a quantitative measure for each node such as discussed in the preceding paragraph is used, the measure adjusted in process block 514 could for example take the form of a number which is initialized to a finite positive value at the start of the web page hierarchy comparison, e.g., in or prior to process block 502, and is adjusted, e.g., decremented according to the discrepancies found at each node comparison (each iteration of process block 514).

In process block 516, the measure representing the degree of match of the two web pages is compared to a threshold value. For example the measure adjusted in process block 514 which represents the degree of match of the hierarchical structure of the two web pages could be initialized to a value of 10, and the threshold value for comparison in process block 516 could be zero. In this case if the measure representing the degree of match of the hierarchical web pages drops below zero, the web pages could be considered to fail the test for similarity.

Process block 518 is a decision block. If the adjusted measure of similarity of the two web pages does not meet the threshold similarity criteria, the process terminates in process block 520. If the adjusted measure of similarity of the two web pages meets the threshold similarity criteria, the process loops back to process block 508 where another node is selected.

Referring back to decision block 510, if none of tags depending from the Kth node match, then process proceeds to decision block 522. In process block 522 it is determined if there is a peer or higher placed node to consider. This determination can be made by referring to one of the hierarchical representations of the web pages. If there is not a peer or higher placed node to consider, the process terminates in process block 524. If there is a peer or higher placed node to consider, the process loops back to process block 508. When the process terminates in either process block 520, or 524 the current status of the relation between the measure of representing the degree of match of the two web documents and the threshold is reported, e.g., to the calling program module, e.g., for use in process block 310.

Thus the process shown in FIG. 5 serves to qualify two web pages as candidates for an ultimate determination that they are two different versions of the same or similar web page.

Illustration of Two Alternative Sequences for Traversing a Hypothetical Tree As shown in FIG. 4 a data structure which represents the hierarchical structure of the HTML code of a web page can be represented by a tree diagram. In process block 508 of the process illustrated in FIGS. 5A, 5B a sequence of nodes in the hierarchical representation of the HTML code of two web pages are selected. For non trivial trees there are multiple alternative sequences for traversing (e.g., selecting new nodes in process block 508) the trees.

Figure 6A:
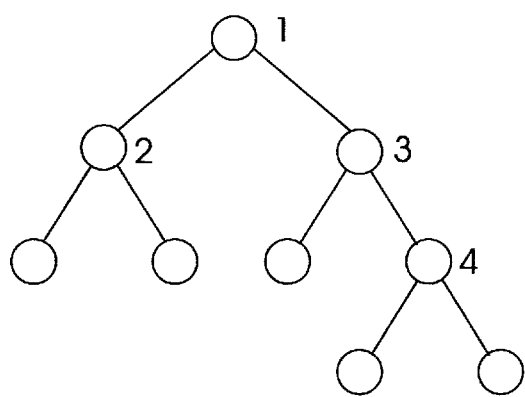
FIG. 6A shows a first alternative sequence for traversing a hypothetical tree structure.
Figure 6B:
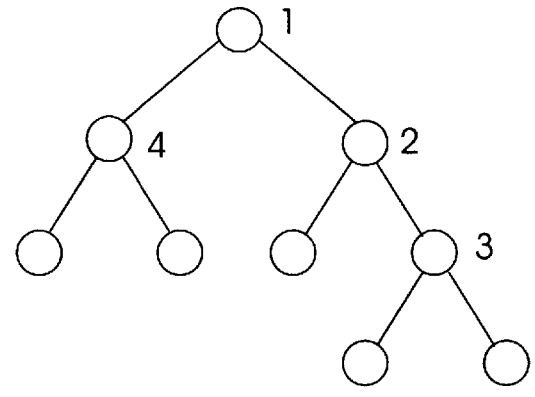
FIG. 6B shows a second alternative sequence for traversing a hypothetical tree structure.

FIG. 6A and FIG. 6B show alternative sequences for traversing a tree. According to the sequence shown in FIG. 6A, the sequence is root, left child of root, right child or root, child of right child of root; whereas in FIG. 6B the sequence is root, right child of root, child of right child of root, left child of root.

If in comparing the Kth node of two trees a discrepancy in the identity of a child of the Kth root is found, then that child may be eliminated from consideration in successive iterations of process block 508. Moreover, if there is no node in one tree corresponding to a node in the other tree then that node cannot be selected in process block 508.

Exemplary Methods for Detecting the Language of a Document

Figure 7A:
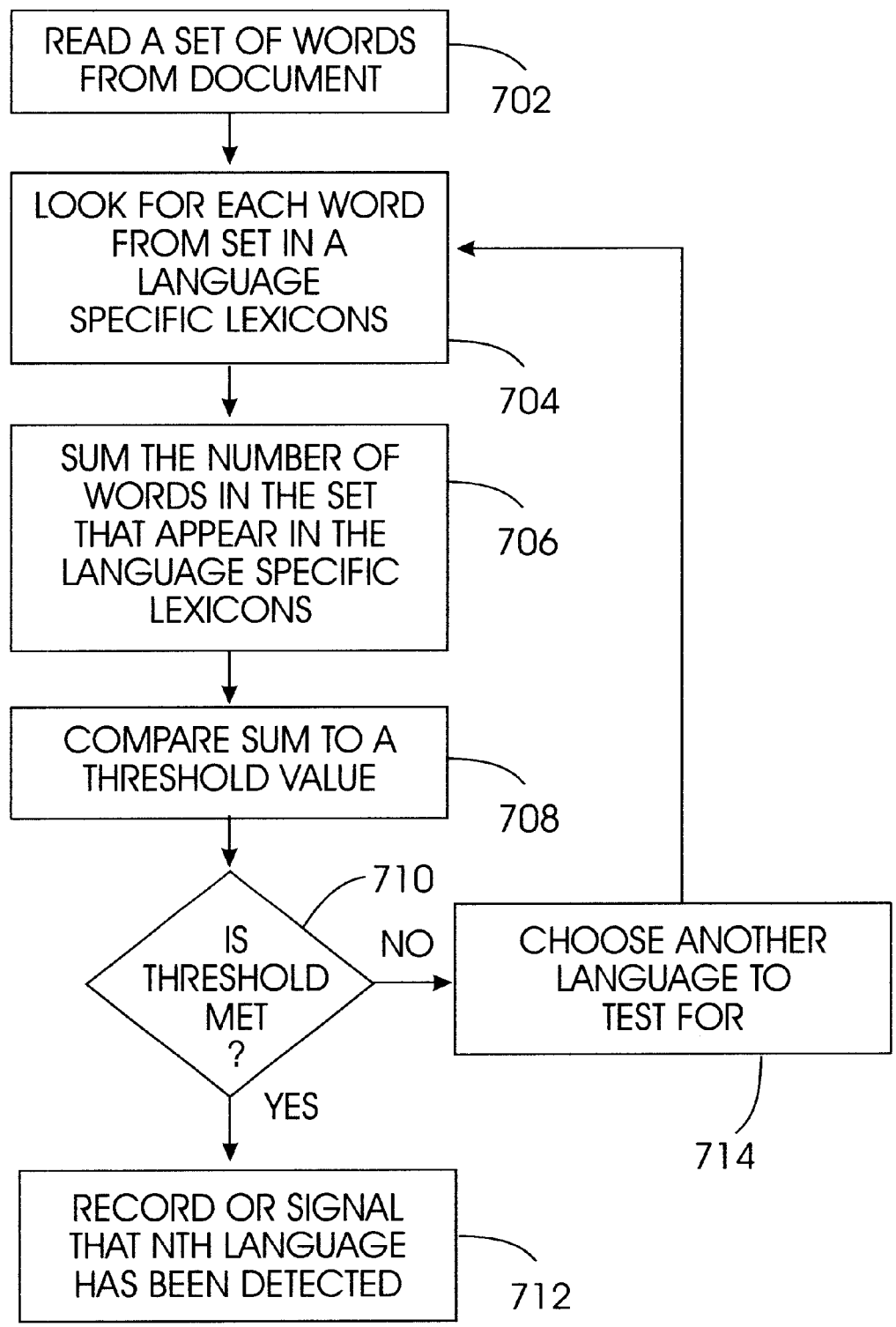
FIG. 7A shows a flow diagram of a first exemplary process for detecting the language of a document.
Figure 7B:
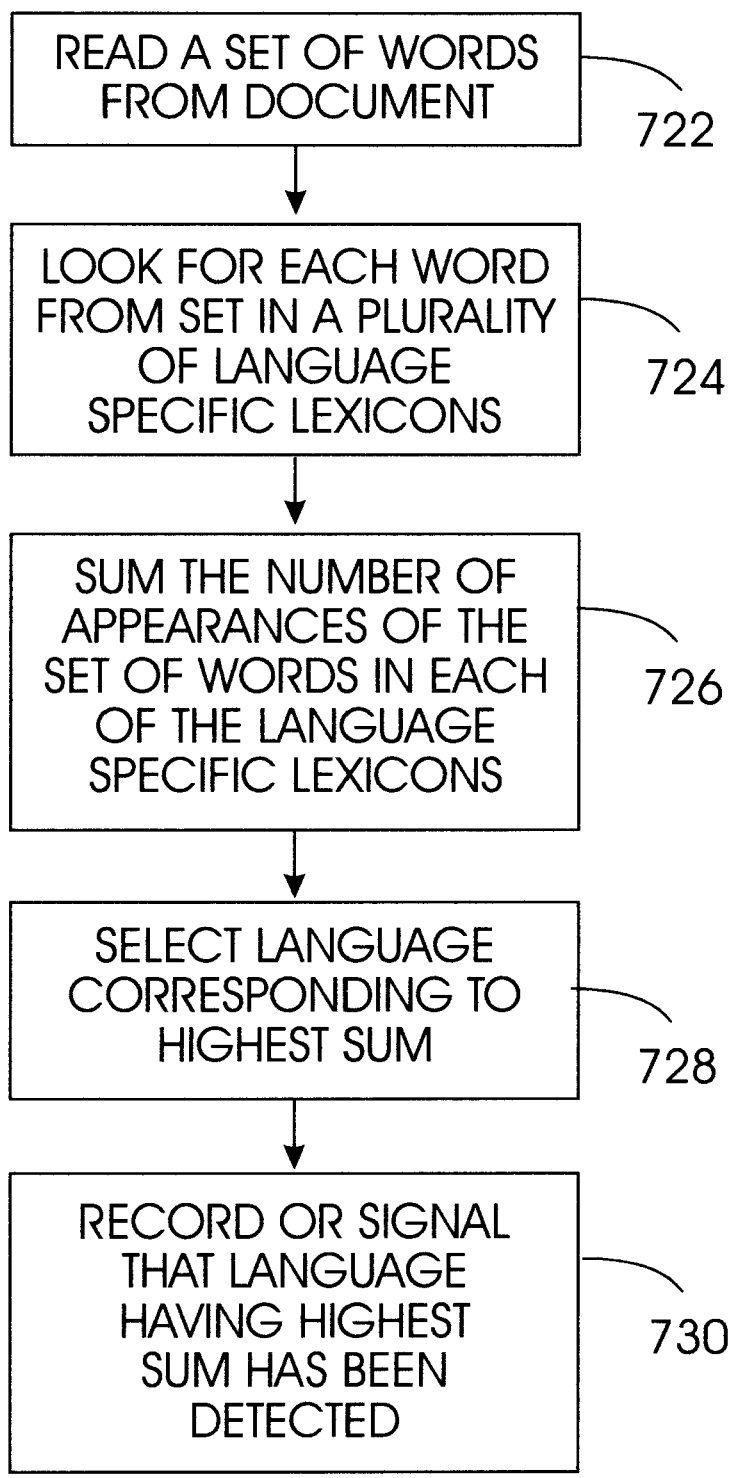
FIG. 7B shows a flow diagram of a second exemplary process for detecting the language of a document.

Referring to FIG. 7A a flow diagram 700 of a first exemplary method for detecting the language of a document as is done in process block 314 of the process shown in FIGS. 3A, 3B, is shown. The method for detecting the routine language of text based document is disclosed in the printed publication entitle "System and Method to Automatically Detecting the Native Language of A Document" with authors Reiner Kraft and Peter Chi-Shing Yim published in the IBM Technical Disclosure Bulletin Vol. 433, published June 2000, which is incorporated in its entirety herein. In process block 702, a set of up to some predetermined number of words is read from a document. In process block 704 each word in the set is looked up in a language specific lexicon. The language specific lexicon is a searchable listing of words in a certain language, and need not include definitions as they are not used in the present process. In process block 706, the number of the words from the set that were found in the lexicon is counted. In process block 708 the count is compared to a threshold value. (A normalized value could be produced by diving the count from process block 708 by the total number of words in the set.) Process block 710 is a decision block. If the threshold is met, the process proceeds to process block 712 where and indication that language of the lexicon has been detected is signaled or recorded (e.g., for use in process blocks 316, 320). If the threshold is not met, another lexicon for testing is chosen in process block 714, and the process loops back to process block 704.

Referring to FIG. 4B a flow diagram 720 of a second exemplary method for detecting the language of a document is shown. In process block 722 a set of words from the document is read. In process block 724 the presence of each word in the set in a set of language specific lexicons is checked. In process block 726 the number of words in the set appearing in each language specific lexicon is summed. In process block 728, the language corresponding to the highest sum is selected. In process block 728 an indication of the language having the highest sum is signaled or recorded. (The term signal as used herein encompasses passing the indication between two program modules)

Figure 8:
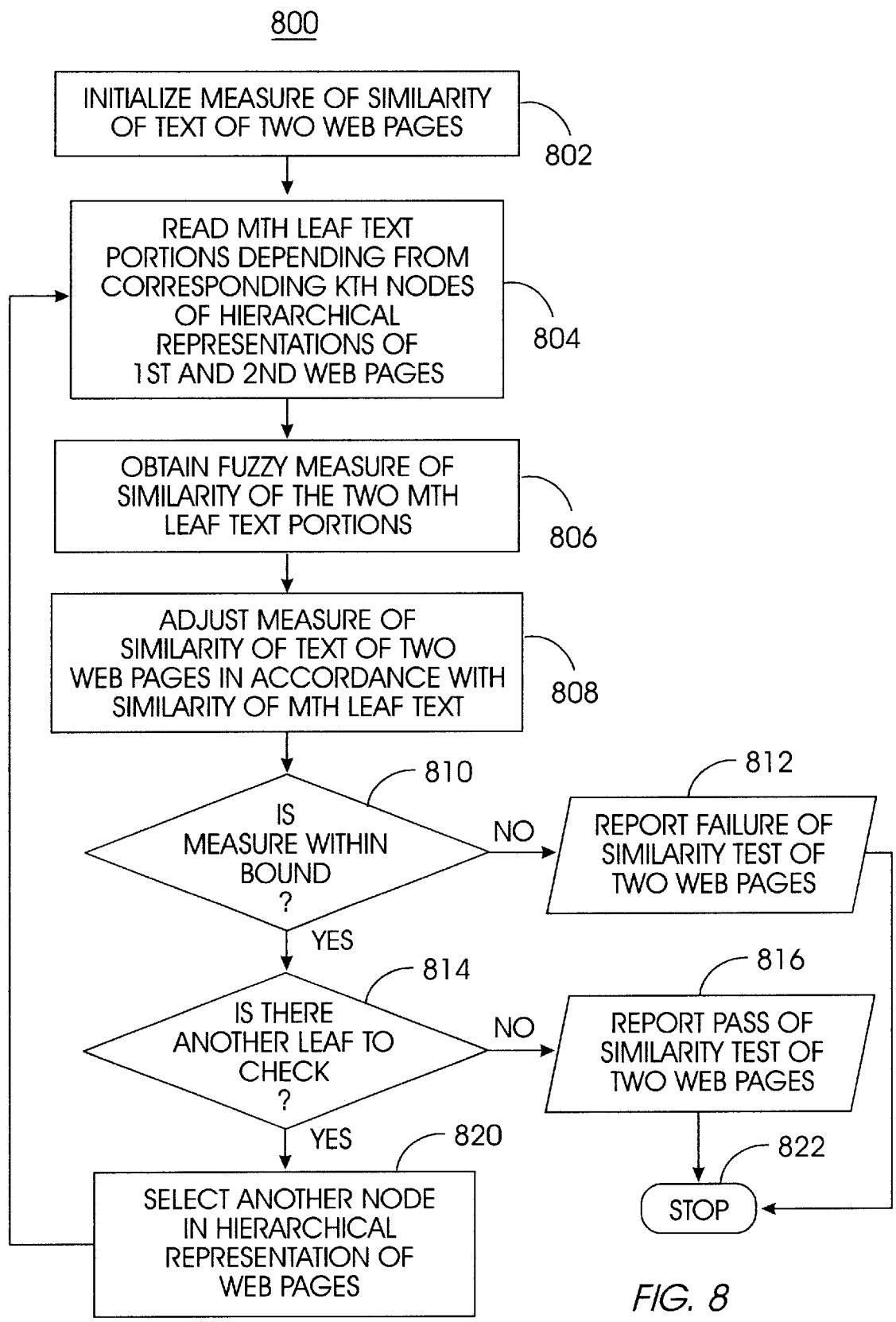
FIG. 8 shows a flow diagram of method for obtaining a measure of similarity of text contained in a structured document.

Method for Obtaining a Measure of Similarity of Text Contained in a Structured Document Referring to FIG. 8, a flow diagram 800 of a method of obtaining a measure of similarity of text contained in a structured document which can be used for process block 324 of the process shown in FIGS. 3A and 3B is shown. In process block 802 a variable representing the similarity of the text of two web pages is initialized, for example to zero. In process block 804 two Mth leaves of text which occupy congruent positions (attached to a Kth node) in two hierarchical data structures (such as the type discussed above in connection with FIG. 4) generated from two web pages (e.g., in process block 306) are read.

In process block 806 a fuzzy measure of the similarity of the two Mth leaves of text is obtained. In process block 808, the measure of similarity of the two web pages which had been initialized in process block 802 is adjusted in accordance with the fuzzy measure of similarity obtained in process block 806. The final value of measure of similarity of the two web pages is preferably a result of mathematical operations, more preferably summing, involving the value to which the measure of similarity of the web pages was initialized, and the values computed in each iteration of process block 806.

In process block 810, it is determined if the measure of similarity adjusted in process block 808 is still within a predefined bound indicating a specified fuzzy degree of similarity. The measure of similarity, and the bound will ordinarily be integer or real variables (quantitative values). If it is not, in process block 812 an indication that texts of the two documents failed the similarity test is signaled or recorded (e.g., passed to the process of block 326). If it is within bounds the process continues to process block 814 in which it is determined if there is another congruent (identically placed) text leaf in the hierarchical structures of the two web pages remaining to be checked. If not, in process block 816 an indication that the text of the documents passed the similarity test is signaled or recorded. If other leaves remain to be check the process continues with process block 820 in which another node from which depends another set of leaves (in the two hierarchical web page structures) is selected. The process then loops back to process block 804.

Process block 822 formally terminates the process. Although the process shown in FIG. 8 is a 'While' loop which continues to select text leaves as long as any remain unchecked or the measure violates the bound, the process could alternatively, for example, use a loop which checks only up to a predetermined number of leaves, for example five leaves.

Exemplary Method for Inducing the Similarity of Two Text Portions

Referring to FIG. 9A, a flow diagram 900 of an exemplary method for inducing a measure of the similarity of two corresponding text portions from two web pages, as is done in process block 806 of the process shown in FIG.8, is shown. In process block 902, the text portions contained in the corresponding leaves (designated Mth leaves) associated with Kth nodes of hierarchical representations of the two web pages are read. In process block 904 a fuzzy measure of the similarity of the two text portions is obtained. This embodiment should not be construed as limited to any particular fuzzy measure of string similarity known in the computer science field.

Referring to FIG. 9B a flow diagram 910 of a process for obtaining a fuzzy similarity measure of two corresponding text portions from two web pages is shown. In process block 912 two text portions from corresponding Mth leaves associated with Kth nodes of two hierarchical representations of two web pages are read. In process block 914, the number of words in the intersection of the sets of words in the two text portions is counted. In process block 916, the number of words in the union of the sets of words in the two text portions is counted. In process block 918, the count of the intersection is divided by the count of the union to obtain a fuzzy measure of the similarity of the two text portions. The more similar the text portions are, the closer the quotient obtained in process block 818 will be to unity. In process block 920 the result of process block 918 is subtracted from unity to obtain a measure of similarity which is has an increasing dependance on the degree of dissimilarity.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method of identifying different versions of the same structured document comprising steps of:

reading a first file including text;

reading a second file including text;

generating from the first file a first hierarchical structured document using formatting codes and leaf content in the first file, wherein the first hierarchical document includes the text of the first file;

generating from the second file a second hierarchical structured document using formatting codes and leaf content in the second file, wherein the second hierarchical document includes the text of the second file;

reading a first portion of text which occupies, a first position in the first hierarchical structured document;

reading a second portion of text which occupies a second position which is congruent to the first position in the second hierarchical structured document; and obtaining a quantitative measure of similarity of the first and the second portions of text.

2. A method according to claim 1 further comprising steps of:

detecting a first language of the first portion of text; and translating the first portion of text into a second language prior to obtaining the quantitative measure of similarity of the first and the second portions of text.

3. A method according to claim 2 further comprising steps of:

adjusting a measure of similarity of the first and the second hierarchical structured documents according to the quantitative measure of similarity of the first and the second portions of text; and comparing the measure of similarity of the first and the second hierarchical structured documents to a bound.

4. A method according to claim 3 further comprising steps of:

reading the first hierarchical data structure to identify a first set of children of a first node, reading the second hierarchical data structure: to identify a second set of children of second node which occupies a position congruent to the first node in the first hierarchical data structure; and comparing the first set of children to the second set of children to obtain a quantitative measure of the degree of match.

5. A method according to claim 4 further comprising steps of:

adjusting a measure representing a degree of match of the first and the second structured hierarchical documents in accordance with the quantitative measure of the degree of match; and comparing the measure representing the degree of match of the first and the second hierarchical documents with a threshold value.

6. A computer readable medium containing programming instructions for identifying different versions of the same structured document including programming instructions for:

reading a first file including text;

reading a second file including text;

generating from the first file a first hierarchical structured document using formatting codes and leaf content in the first file, wherein the first hierarchical document includes the text of the first file;

generating from the second file a second hierarchical structured document using formatting codes and leaf content in the second file, wherein the second hierarchical document includes the text of the second file;

reading a first portion of text which occupies a first position in the first hierarchical structured document;

reading a second portion of text which occupies a second position which is congruent to the first position in the second hierarchical structured document; and obtaining a quantitative measure of similarity of the first and the second portions of text.

7. A computer readable medium according to claim 6 further comprising programming instructions for:

detecting a first language of the first portion of text; and translating the first portion of text into a second language prior to obtaining the quantitative measure of similarity of the first and the second portions of text.

8. A computer readable medium according to claim 7 further comprising programming instructions for:

adjusting a measure of similarity of the first and the second hierarchical structured documents according to the quantitative measure of similarity of the first and the second portions of text; and comparing the measure of similarity of the first and the second hierarchical structured documents to a bound.

9. A computer readable medium according to claim 8 further comprising programming instructions for:

reading the first hierarchical data structure to identify a first set of children of a first node, reading the second hierarchical data structure to identify a second set of children of second node which occupies a position congruent to the first node in the first hierarchical data structure; and comparing the first set of children to the second set of children to obtain a quantitative measure of the degree of match.

10. A computer readable medium according to claim 9 further comprising programming instructions for:

adjusting a measure representing a degree of match of the first and the second structured hierarchical documents in accordance with the quantitative measure of the degree of match; and comparing the measure representing the degree of match of the first and the second hierarchical documents with a threshold value.

11. A system for identifying different versions of the same structured document comprising:

means for reading a first file including text;

means for reading a second file including text;

means for generating from the first file a first hierarchical structured document using formatting codes and leaf content in the first file, wherein the first hierarchical document includes the text of the first file;

means for generating from the second file a second hierarchical structured document using formatting codes and leaf content in the second file, wherein the second hierarchical document includes the text of the second file;

means for reading a first portion of text which occupies a first position in the first hierarchical structured document;

means for reading a second portion of text which occupies a second position which is congruent to the first position in the second hierarchical structured document; and means for obtaining a quantitative measure of similarity of the first and the second portions of text.

12. A method of identifying different versions of the same structured document comprising:

reading a first file and a second file, wherein the first file and the second file include language data;

generating from the first file a first hierarchical structured document using formatting codes and leaf content in the first file, wherein the first hierarchical structured document includes the language data of the first file;

generating for the second file a second hierarchical structured document using formatting codes and leaf content in the second file, wherein the second hierarchical structured document includes the language data of the second file;

comparing the hierarchical structure of the first hierarchical structured document with the hierarchical structure of the second hierarchical structured document; and calculating a quantitative measure of similarity between the hierarchical structure of the first hierarchical structured document and the hierarchical structure of the second hierarchical structured document.

13. The method of claim 12, further comprising:

wherein if the hierarchical structure of the first hierarchical structured document and the hierarchical structure of the second hierarchical structured document are substantially similar, then determining whether the language data of the first hierarchical structured document is in a preferred format; and wherein if the language data of the first hierarchical structured document is not in a preferred format, then transforming the language data of the first hierarchical structured document into the preferred format.

14. The method of claim 13, further comprising:

determining whether the language data of the second hierarchical structured document is in the preferred format; and wherein if the language data of the second hierarchical structured document is not in the preferred format, then transforming the language data of the second hierarchical structured document into the preferred format.

15. The method of claim 14, further comprising:

reading a first portion of language data which occupies a first position in the first hierarchical structured document;

reading a second portion of language data which occupies a second position in the second hierarchical structured document wherein the second position is congruent to the first position in the first hierarchical structured document; and calculating a quantitative measure of similarity of the first and the second portions of language data.

16. The method of claim 12, further comprising:

wherein if the hierarchical structure of the first hierarchical structured document and the hierarchical structure of the second hierarchical structured document are substantially similar, then:

reading a first portion of language data which occupies a first position in the first hierarchical structured document;

reading a second portion of language data which occupies a second position in the second hierarchical structured document, wherein the second position is congruent to the first position in the first hierarchical structured document; and calculating a quantitative measure of similarity of the first and the second portions of language data.

* * * * *